(12) United States Patent
Praw et al.

(10) Patent No.: US 11,267,929 B2
(45) Date of Patent: Mar. 8, 2022

(54) PHYSICAL PROPERTY IMPROVEMENT OF POLYURETHANES

(71) Applicant: BASF SE, Ludwigshafen am Rhein (DE)

(72) Inventors: Michael Praw, Wyandotte, MI (US); Micheal Colin May, Wyandotte, MI (US)

(73) Assignee: BASF SE, Ludwigshafen am Rhein (DE)

( * ) Notice: Subject to any disclaimer, the term of this patent is extended or adjusted under 35 U.S.C. 154(b) by 253 days.

(21) Appl. No.: 16/472,443

(22) PCT Filed: Jan. 12, 2018

(86) PCT No.: PCT/US2018/013471
§ 371 (c)(1),
(2) Date: Jun. 21, 2019

(87) PCT Pub. No.: WO2018/132648
PCT Pub. Date: Jul. 19, 2018

(65) Prior Publication Data
US 2020/0308335 A1 Oct. 1, 2020

Related U.S. Application Data

(60) Provisional application No. 62/445,447, filed on Jan. 12, 2017.

(51) Int. Cl.
| | | |
|---|---|---|
| C08G 18/48 | (2006.01) | |
| C08G 18/62 | (2006.01) | |
| C08G 18/76 | (2006.01) | |
| C08G 18/73 | (2006.01) | |
| C08G 18/79 | (2006.01) | |
| C09J 175/08 | (2006.01) | |
| C08L 75/08 | (2006.01) | |
| C09D 175/08 | (2006.01) | |

(52) U.S. Cl.
CPC ....... *C08G 18/4829* (2013.01); *C08G 18/485* (2013.01); *C08G 18/6225* (2013.01); *C08G 18/73* (2013.01); *C08G 18/7621* (2013.01); *C08G 18/7671* (2013.01); *C08G 18/797* (2013.01); *C08L 75/08* (2013.01); *C09D 175/08* (2013.01); *C09J 175/08* (2013.01); *C08G 2170/00* (2013.01); *C08G 2190/00* (2013.01)

(58) Field of Classification Search
CPC .......... C08G 18/4829; C08G 18/6225; C08G 18/7671; C08G 2170/00; C08G 18/73; C08G 18/485; C08G 18/797; C08G 2190/00; C08L 75/08; C09D 175/08; C09J 175/08
See application file for complete search history.

(56) References Cited

U.S. PATENT DOCUMENTS

| | | | |
|---|---|---|---|
| 5,127,973 A | 7/1992 | Sengupta et al. | |
| 6,482,878 B1 | 11/2002 | Chu | |
| 2014/0255560 A1* | 9/2014 | Eklund | C08G 18/36 426/106 |

FOREIGN PATENT DOCUMENTS

| | | |
|---|---|---|
| CN | 105176475 A | 12/2015 |
| JP | 59-176378 A | 10/1984 |
| JP | 61-294008 A | 12/1986 |
| JP | 2003-531271 A | 10/2003 |
| JP | 2014-196411 A | 10/2014 |
| WO | 93/05099 A1 | 3/1993 |
| WO | WO 93/05099 * | 3/1993 |

OTHER PUBLICATIONS

First Examination Report from corresponding Indian Patent Application No. 201927031688 dated Mar. 26, 2021.
First Office Action from corresponding Chinese Patent Application No. 201880006556.8 dated Mar. 31, 2021, and its English translation.
International Preliminary Report on Patentability from counterpart International Application No. PCT/US2018/0013471 dated Jul. 16, 2019.
Guan, Shiwei William, 100% Solids Polyurethane and Polyurea Coatings Technology, *Coatings World*, Mar. 2003, pp. 49-58.
International Search Report and Written Opinion from counterpart International Application No. PCT/US2018/0013471 dated May 25, 2018.
Second Office Action from corresponding Chinese Patent Application No. 201880006556.8 dated Nov. 19, 2021, and an English summary.
Zhu, W. et al., *Basic Textbook of Coatings*, Southwest Jiaotong University Press, Jun. 2012, 1st edition, p. 36, and a brief English summary.
Notice of Reasons for Refusal from corresponding Japanese Patent Application No. 2019-537800 dated Dec. 22, 2021, and its English translation.

* cited by examiner

*Primary Examiner* — Robert D Harlan
(74) *Attorney, Agent, or Firm* — DLA Piper LLP (US)

(57) ABSTRACT

100% solids polyurethanes having improved physical properties in terms of Shore hardness, tear strength, elongation at break and/or tensile strength are realized through the introduction of 100% solids hydroxyl-functional acrylics in combination with the hydroxyl-functional polyether and 100% solids isocyanate-functional compounds. When an aromatic isocyanate is used, the isocyanate-reactive component includes from 5 to 70% by weight of a hydroxyl-functional polyether having a weight average molecular weight ranging from 180 to 6,500 g/mol, and 30 to 95% by weight of a hydroxyl-functional acrylic. When an aliphatic isocyanate is used, the isocyanate-reactive component includes from 40 to 70% by weight of a hydroxyl-functional polyether having a weight average molecular weight ranging from 180 to 6,500 g/mol, and 30 to 60% by weight of a hydroxyl-functional acrylic.

10 Claims, No Drawings

PHYSICAL PROPERTY IMPROVEMENT OF POLYURETHANES

BACKGROUND OF THE INVENTION

1. Field of the Invention

The subject invention generally relates to polyurethanes formed as the reaction product of a 100% solids isocyanate-reactive component having hydroxyl-functional groups and a 100% solids isocyanate component, and more particularly to physical property improvements of such polyurethanes through the inclusion of a hydroxyl-functional acrylic to the hydroxyl-functional polyether as the 100% solids isocyanate-reactive component.

2. Description of the Related Art

Polyurethanes (i.e., polyurethane compositions) are rapidly developing products for use as in a wide variety of applications because they have unique combinations of performance and application properties. Polyurethanes are formulated using an isocyanate-reactive component having one or more hydroxyl-functional groups (i.e., a compound having one or more hydroxyl-functional groups (OH groups)) as a base component and an isocyanate component (i.e., a compound having one or more isocyanate-functional groups (NCO groups)) that typically functions as a cross-linker or hardener. The isocyanate component is typically mixed with the isocyanate-reactive component on the basis of equivalent weight at a desired proportion ratio of isocyanate-functional groups to hydroxyl-functional groups (i.e., at a desired NCO:OH ratio), wherein the reaction of the isocyanate-functional groups with the hydroxyl-functional groups thereafter forms the polyurethane composition. The type of polyurethane products formed, as well as the performance and application properties of the polyurethane products, is dependent upon the type of isocyanate-reactive component and corresponding isocyanate component as well as the desired NCO:OH ratio.

In certain applications, hydroxyl-functional polyethers, such as polyether polyols, are utilized as the isocyanate-reactive component because they have relatively low molecular weights and solution viscosities, particularly where the polyurethanes are to be formed as a coating, an adhesive, a sealant or an elastomer. However, polyurethanes formed with such low molecular weight and low viscosities hydroxyl-functional polyethers and used as coatings, adhesives, sealants or elastomers typically have low Shore hardness values and limited tear strength, elongation at break and/or tensile strength.

Hydroxyl-functional acrylics, such as acrylic polyols, have also been contemplated for use in forming polyurethanes because they provided different physical property characteristics (such as differences in Shore hardness, tear strength, elongation at break or tensile strength) as compared with hydroxyl-functional polyethers. Typically, hydroxyl-functional acrylics are obtained by free-radical polymerization of acrylate and methacrylate esters and styrene (such as ethyl acrylates (EA) or butyl acrylates (BA), acrylic acid (AA), methyl methacrylate (MMA), or styrene (ST)) in a batch solvent process. Hydroxyl functionality is introduced by adding ethylenically unsaturated monomers having at least one free hydroxyl group, typically hydroxy-functional acrylates (HFAs) such as 2-hydroxyethyl acrylates (HEA) or 4-hydroxybutyl acrylates (HBA), to the monomer blend.

Since hydroxyl-functional acrylics have high molecular weights and solution viscosity, they typically cannot be used by themselves as the isocyanate-reactive component in forming polyurethane coatings, adhesives, sealants or elastomers unless the viscosities of such hydroxyl-functional acrylic are reduced to a desirable viscosity with solvent prior to mixing with the isocyanate component.

Because hydroxyl-functional acrylics are compatible with hydroxyl-functional polyethers, it has been contemplated that hydroxyl-functional acrylics be added to hydroxyl-functional polyethers in order to improve one or more of the aforementioned physical properties of polyurethanes. However, such hydroxyl-functional acrylics formed from a batch solvent process include solvent and, accordingly, polyurethanes formed from such hydroxyl-functional acrylics, even where such hydroxyl-functional acrylics are introduced in small amounts, have a residual solvent smell. Moreover, attempts to remove the solvents from hydroxyl-functional acrylics formed in the batch solvent process post-production are laborious and difficult, and typically do not remove all of the solvent present.

SUMMARY OF THE INVENTION AND ADVANTAGES

The subject application provides methods for improving one or more physical properties of polyurethanes formed as the reaction product of 100% solids hydroxyl-functional polyethers and 100% solids isocyanate-functional components. The improvement is provided through the introduction of 100% solids hydroxyl-functional acrylics in combination with the hydroxyl-functional polyether. More particularly, the polyurethane is formed as the reaction product of reactants comprising a 100% solids hydroxyl-functional polyethers, 100% solids hydroxyl-functional acrylics and a 100% solids isocyanate component having isocyanate-functional groups reactive with the hydroxyl groups of the hydroxyl-functional polyether and acrylics. The present invention thus provides the method for improving the physical properties of the polyurethanes, and also provides the associated improved polyurethanes.

In one embodiment of the invention in which the isocyanate component is an aromatic isocyanate component, the polyurethane comprises the reaction product of reactants comprising:
    a 100% solids isocyanate-reactive component having hydroxyl-functional groups, said isocyanate-reactive component comprising:
        30 to 95% by weight of a hydroxyl-functional polyether having a weight average molecular weight ranging from 180 to 6,500 g/mol (grams per mole), and
        5 to 70% by weight of a hydroxyl-functional acrylic, wherein said % by weight is based on the total weight of said hydroxyl-functional polyether and said hydroxyl-functional acrylic; and
    a 100% solids aromatic isocyanate component having isocyanate-functional groups reactive with said hydroxyl-functional groups.

In another embodiment of the invention in which the isocyanate component is an aliphatic isocyanate component, the polyurethane comprises the reaction product of reactants comprising:
    a 100% solids isocyanate-reactive component having hydroxyl-functional groups, said isocyanate-reactive component comprising 40 to 95% by weight of a hydroxyl-functional polyether having a weight average molecular weight ranging from 180 to 6,500 g/mol, and 5 to 60% by weight of an hydroxyl-functional acrylic, wherein said % by weight is based on the total weight of said hydroxyl-functional polyether and said hydroxyl-functional acrylic; and a 100% solids aliphatic isocyanate component having isocyanate-functional groups reactive with said hydroxyl-functional groups.

The inclusion of the hydroxyl-functional acrylics blended with the hydroxyl-functional polyethers as the 100% solids isocyanate-reactive component in combination with a 100% solids aliphatic isocyanate component provided improvements to one or more physical properties of the polyurethanes as compared with similar polyurethanes formed with the same hydroxyl-functional polyether and the same aliphatic isocyanate component mixed at the same predetermined NCO/OH ratio and reacted under the same reaction conditions. Such improved physical properties include one or more of improvements to Shore hardness, tear strength, elongation at break and/or tensile strength.

In addition, in both exemplary embodiments, the use of the hydroxyl-functional acrylics formed from a solid grade oligomer process, as compared with a batch solvent process in which the hydroxyl-functional acrylic is formed after which solvent is removed, ensures that the hydroxyl-functional acrylics used are 100% solids, and thus ensures that the polyurethanes formed do not have residual solvent smell associated with the hydroxyl-functional acrylics. Moreover, the elimination of solvents and plasticizers prior to, and subsequent to forming the polyurethane reaction product eliminates potential environmental concerns or safety issues related to the inclusion of solvents and plasticizers in the process.

DETAILED DESCRIPTION OF THE INVENTION

The subject application provides 100% solids polyurethanes (i.e., polyurethane compositions) having improved physical properties which are formed from reactants comprising 100% solids isocyanate components and 100% solids isocyanate-reactive components. These polyurethanes, in general, are formed as the reaction product of reactants comprising a 100% solids hydroxyl-functional polyether having hydroxyl-functional groups as the isocyanate-reactive component and a 100% solids isocyanate component having isocyanate-functional groups reactive with the hydroxyl groups of the hydroxyl-functional polyethers as the isocyanate component. The improvement to the physical properties of the resultant polyurethanes is realized through the introduction of 100% solids hydroxyl-functional acrylics mixed with the hydroxyl-functional polyethers used to form the polyurethanes.

The term "100% solids", as used herein with respect to, for example, 100% solids isocyanate-reactive component having hydroxyl-functional groups (including 100% solids hydroxyl-functional polyethers) and 100% solids isocyanate-functional compounds, refers to the particular polymers or components used in the present invention being devoid of volatile content (i.e., where volatile content is not present) or wherein volatile content is present in relatively very small amounts in a particular polymer or component utilized. Such volatile content may be present due to the use of the particular volatile content during the manufacturing of the particular polymer that is not completely removed post-manufacture, or wherein such volatile content is included in the polymer or component post-manufacture for reasons related to a particular desired feature of the polymer or components, such as stability or the like, but typically not included in amounts that would function to reduce the viscosity or otherwise affect the flow characteristics of the particular polymer or component during its post-manufacture use. Such volatile content may be included therefore in the form of a solvent added during or after the manufacture of the particular polymer or component, or may be included as a component in an additive (such as a plasticizer, catalyst, etc.) that is introduced to the polymer or component during or after manufacturing. Accordingly, for the purposes of the present invention, "100% solids" polymers or components refer to polymers or components that are completely devoid of volatile content and also refers to polymers or components that contain residual very small amounts of volatile content in amounts that do not substantially affect the viscosity or flow characteristics of the polymer or component, such as, for example, in amounts of less than 5% by weight, and more particularly in amounts of less than 1% by weight, and even more particularly in amounts less than about 0.5% by weight, and most particularly in amounts less than about 0.1% by weight, based upon the the total weight of the particular polymer or component, or therefore resulting in a polyurethane having a volatile content of less than 5% by weight, and more particularly in amounts of less than 1% by weight, and even more particularly in amounts less than about 0.5% by weight, and most particularly in amounts less than about 0.1% by weight, based upon the the total weight of the polyurethane.

The hydroxyl-functional polyethers (i.e., hydroxyl-functional polyether-group containing polymers) used as one of the reactants in forming the polyurethanes of the present invention are polyether polymers that include one or more hydroxyl-functional (OH-functional) groups, typically at least two OH-functional groups. Accordingly, the hydroxyl-functional polyether are polyether polymers having one OH-functional group (i.e., a polyether monol), two OH-functional groups (i.e., a polyether diol), three OH-functional groups (i.e., a polyether triol), four OH-functional groups (i.e., a polyether tetrol), polyether-group containing polymers having more than four OH-functional groups, and combinations thereof. The hydroxyl functionality of these hydroxyl-functional polyethers is typically expressed in terms of an average functionality of all of the respective polymer chains present in the collective hydroxyl-functional polyether blend.

Hydroxyl-functional polyethers having an average of two or more OH-functional groups per molecule are sometimes alternatively referred to as polyether polyols, which are typically formed as the polymeric reaction product of an organic oxide and an initiator compound containing two or more active hydrogen atoms. The active hydrogen compound in the presence of a base catalyst initiates ring opening and oxide addition, which is continued until the desired molecular weight is obtained. If the initiator has two active hydrogens, a diol results. If a trifunctional initiator such as glycerine is used, the oxide addition produce chain growth in three directions, and a triol results.

The hydroxyl-functional polyethers can be any type of hydroxyl-functional polyethers known in the art. The hydroxyl-functional polyethers can be non-ethoxylated or ethoxylated. In addition, the hydroxyl-functional polyethers can be short chain, low molecular weight hydroxyl-functional polyethers having one or more OH-functional groups. Particularly suitable hydroxyl-functional polyethers for use in the polyurethanes include, but are not limited to, products obtained by the polymerization of a cyclic oxide, for example ethylene oxide (EO), propylene oxide (PO), butylene oxide (BO), or tetrahydrofuran in the presence of initiator compounds having one or more active hydrogen atoms. Suitable initiator compounds including a plurality of active hydrogen atoms for use in obtaining hydroxyl-functional polyethers include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable hydroxyl-functional polyethers include polyether diols and triols, such as polyoxypropylene diols and triols and poly(oxyethylene-oxypropylene)diols and triols obtained by the simultaneous or sequential addition of ethylene and propylene oxides to di- or tri-functional initiators. Copolymers having oxyethylene contents of from about 5 to about 90% by weight, based on the weight of the polyether polyol component, of which the polyether polyols may be block copolymers, random/block copolymers or random copolymers, can also be used. Yet other suitable hydroxyl-functional polyethers include polytetramethylene ether glycols obtained by the polymerization of tetrahydrofuran.

Particularly suitable hydroxyl-functional polyethers for use include those based on a totally heteric (or random) EO, PO structure, or those having heteric, but uniform blocks of EO and PO, e.g. blocks comprising EO and blocks comprising PO. As yet another suitable example, the hydroxyl-functional polyethers can have heteric blocks and uniform blocks of EO and PO, e.g. blocks comprising all EO or PO and blocks comprising random EO, PO. Still further, in certain examples, the hydroxyl-functional polyethers can be heteric or random copolymers of EO and PO and end-blocked with either EO or PO.

Suitable non-limiting commercial hydroxyl-functional polyethers having an average of two OH-functional groups per molecule, sometimes referred to as polyether diols, for use in the present invention are based upon the propoxylation and/or ethoxylation of diethylene glycol, dipropylene glycol, ethylene glycol, or propylene glycol include Pluracol® P410R, 1010, 2010, 1062, and 1044, each commercially available from BASF Corporation of Florham Park, N.J. In particular, Pluracol® P410R, 1010, 2010, and 1044 are PO-containing hydroxyl-functional polyether diols, while Pluracol® 1062 is a PO-containing hydroxyl-functional polyether diols endcapped with EO.

Suitable non-limiting commercial hydroxyl-functional polyethers having an average of three OH-functional groups per molecule, sometimes referred to as polyether triols, for use in the present invention are based on the propoxylation and/or ethoxylation of glycerin or trimethyolpropane include Pluracol® GP430, GP730, 4156, 2090, and 816, each commercially available from BASF Corporation of Florham Park, N.J. In particular, Pluracol® GP430 and GP730 are PO-containing hydroxyl-functional polyether triols, Pluracol® 2090 and 816 are a PO-containing hydroxyl-functional polyether triol endcapped with EO, while Pluracol® 4156 is a pure heteric hydroxyl-functional polyether triol.

Suitable non-limiting commercial hydroxyl-functional polyethers having an average of four OH-functional groups per molecule, sometimes referred to as polyether tetrols, propoxylation and/or ethoxylation of toluene diamine, ethylene diamine, and pentaerythritol for use in the present invention include Pluracol® 735, 736 and PEP 500 and Quadrol, each commercially available from BASF Corporation of Florham Park, N.J. In particular, Pluracol® 735 is a toluene diaimine initiated hydroxyl-functional polyether polyol based on PO, Pluracol® 736 is a toluene diaimine initiated hydroxyl-functional polyether polyol based on EO, Pluracol® PEP 500 is a pentaerrythritol initiated heteric, and Quadrol is an ethylene diamine initiated hydroxyl-functional polyether polyols based on PO.

One suitable non-limiting commercial higher hydroxyl-functional polyethers for use in the present invention are based on sucrose, sorbitol or combinations thereof alone or in combination with other initiators is Pluracol® SG360 (based on sucrose and glycerin), commercially available from BASF Corporation of Florham Park, N.J.

In certain of these embodiments, the hydroxyl-functional polyethers for use in the present invention have a weight average molecular weight (Mw) ranging from 180 to 6,500 g/mol, as measured by gel permeation chromatography (GPC) or nuclear magnetic resonance (NMR) previously calibrated using a calibration curve based on mono-dispersed polystyrene standards.

In certain embodiments, a combination of two or more hydroxyl-functional polyethers for use in the present invention can be used, with each of the two or more hydroxyl-functional polyethers having the same or a different weight average molecular weight within the range of 180 to 6,500 g/mol described above. Thus, for example, the hydroxyl-functional polyethers used may include a first hydroxyl-functional polyether having a weight average molecular weight ranging from 180 to 6,500 g/mol and a second hydroxyl-functional polyether different from the first hydroxyl-functional polyether also having a weight average molecular weight ranging from 180 to 6,500 g/mol. Representative examples of the two or more hydroxyl-functional polyethers include those described in the paragraphs above.

As also noted above, the isocyanate-reactive component also includes a 100% solids hydroxyl-functional acrylic. The hydroxyl-functional acrylic, in certain instances, is a 100% solids acrylic-modified polyether polyol (i.e., a 100% solids acrylic polyol). Such hydroxyl-functional acrylics are obtained by free-radical polymerization of acrylate and methacrylate esters and styrene (such as ethyl acrylates (EA) or butyl acrylates (BA), acrylic acid (AA), methyl methacrylate (MMA), or styrene (ST)). Hydroxyl functionality is introduced by adding ethylenically unsaturated monomers having at least one free hydroxyl group, typically hydroxy-functional acrylates (HFAs) such as 2-hydroxyethyl acrylates (HEA) or 4-hydroxybutyl acrylates (HBA), to the monomer blend. One exemplary 100% solids acrylic-modified polyether polyol in Joncryl 569, commercially available from BASF Corporation of Florham Park, N.J., having a hydroxyl number of 140 mgKOH/g.

Preferably, the 100% solids hydroxyl-functional acrylic utilized in the present invention are formed in a solid grade oligomer process as opposed to a batch solvent process to ensure that there is virtually no residual solvent present. Exemplary patents describing the formation of 100% solids hydroxyl-functional acrylic using a solid grade oligomer process are provided in the following U.S. Pat. Nos.: 5,508,366; 4,546,160; 4,529,787; 4,414,370; 5,098,956; and 5,098,952, which are herein incorporated by reference.

As also noted above, the polyurethane of the present invention also includes an isocyanate component as one of its reactants. The isocyanate component typically has an average functionality of from about 1.5 to about 3.0, more typically from about 2.0 to about 2.8, and yet more typically about 2.7. The isocyanate component also typically has an NCO content varying from a few weight percent to around 50 weight percent, depending upon the isocyanate component. For aliphatic isocyanates, the NCO content may range from about 18 to 30 wt. %. For aromatic isocyanates, the NCO content may range from 25 to 50 wt. %. For isocyanate prepolymers the range may vary from 1 to 47 wt. %, more typically 1-29 wt. %. For hexamethylene diisocyanate (HDI), the isocyanate component typically has an NCO content of from about 20 to about 23.5 wt. %. For methylene diphenyl diisocyanate (MDI), the isocyanate component typically has an NCO content of from about 29 to about 34 wt. %. For toluene diisocyanate (TDI), the isocyanate component typically has an NCO content of from about 45 to about 50 wt. %.

Suitable isocyanates for use in the isocyanate component include, but are not limited to, aromatic or aliphatic isocyanate-group containing compounds such as methylene diphenyl diisocyanate (MDI), polymethylene polyphenylisocyanate (PMDI), hexamethylene diisocanate (HDI), an isocyanate-terminated prepolymer, a carbodiimide polymer having unreacted isocyanate groups (i.e., free (pendent) NCO groups), and any combinations thereof.

The isocyanate-terminated prepolymer, when present in the isocyanate component of the second composition, is generally the reaction product of an isocyanate and an active hydrogen-containing species and is formed by various methods understood by those skilled in the art or can be obtained commercially from a manufacturer, a supplier, etc.

With regard to the isocyanate used to form the isocyanate-terminated prepolymer in this first method, the isocyanate may include one or more isocyanate (NCO) functional groups, typically at least two NCO functional groups. Suitable isocyanates, for purposes of the present invention for use in forming the isocyanate-terminated prepolymer include, but are not limited to, conventional aliphatic, cycloaliphatic, aryl and aromatic isocyanates.

In certain embodiments, the isocyanate of the isocyanate-terminated prepolymer of the second composition is selected from the group of methylene diphenyl diisocyanate (also sometimes referred to as diphenylmethane diisocyanate, MDI, or monomeric MDI), polymethylene polyphenyl diisocyanate (also sometimes referred to as polymeric diphenylmethane diisocyanate, polymeric MDI or PMDI), and combinations thereof. MDI exists in three isomers (2,2'-MDI, 2,4'-MDI, and 4,4'-MDI) however, the 4,4' isomer (sometimes referred to as Pure MDI) is most widely used. For the purposes of the present invention, the term "MDI" refers to all three isomers unless otherwise noted. In these embodiments, MDI and PMDI are desirable for use over toluene diisocyanate (TDI) due to their lower reactivity, which allows further penetration/impregnation of the isocyanate-terminated prepolymer into the paperboard or paper media after application and prior to substantial curing. In addition, MDI or PMDI allows for the formation of more flexible treated paperboards, as compared to the use of TDI, due to the methylene bridges contained within these structures. Still further, MDI and PMDI have lower vapor pressure than TDI, allowing safer handling prior to and during application.

In certain embodiments, the isocyanate-terminated prepolymer of the second composition comprises a blend of PMDI and quasi-prepolymers of 4,4'-methyldiphenyldiisocyanate. Specific examples of suitable isocyanate-terminated prepolymers, for purposes of the present invention, are commercially available from BASF Corporation of Florham Park, N.J., under the trademark LUPRANATE®, such as LUPRANATE® MP102. It is to be appreciated that the system can include a combination of two or more of the aforementioned isocyanate-terminated prepolymers.

Exemplary diisocyanates that may be used in forming the polycarbodiimide include, but are not limited to: MDI (in any the three isomers (2,2'-MDI, 2,4'-MDI, and 4,4'-MDI); m-phenylene diisocyanate; 2,4-toluene diisocyanate; 2,6-toluene diisocyanate; hexamethylene diisocyanate; 1,4-phenylene diisocyanate; tetramethylene diisocyanate; cyclohexane-1,4-diisocyanate; hexahydrotoluene diisocyanate; methylenediisocyanate; 2,6-diisopropylphenyl isocyanate; m-xylylene diisocyanate; dodecyl isocyanate; 3,3'-dichloro-4,4'-diisocyanato-1,1'-biphenyl; 1,6-diisocyanato-2,2,4-trimethylhexane; 3,3'-dimethoxy-4,4'-biphenylene diisocyanate; 2,2-diisocyanatopropane; 1,3-diisocyanatopropane; 1,4-diisocyanatobutane; 1,5-diisocyanatopentane; 1,6-diisocyanatohexane; 2,3-diisocyanatotoluene; 2,4-diisocyanatotoluene; 2,5-diisocyanatotoluene; 2,6-diisocyanatotoluene; isophorone diisocyanate; hydrogenated methylene bis(phenylisocyanate); naphthalene-1,5-diisocyanate; 1-methoxyphenyl-2,4-diisocyanate; 1,4-diisocyanatobutane; 4,4'-biphenylene diisocyanate; 3,3'-dimethyldiphenylmethane-4,4'-diisocyanate; 4,4',4"-triphenylmethane triisocyanate; toluene-2,4,6-triisocyanate; 4,4'-dimethyldiphenylmethane-2,2',5,5'-tetraisocyanate; polymethylene polyphenylene polyisocyanate; or a mixture of any two or more thereof. In a preferred embodiment, the diisocyanate is 2,4-toluene diisocyanate, 2,6-toluene diisocyanate, or a mixture of 2,4- and 2,6-toluene diisocyanate.

In certain embodiments, the isocyanate component for forming the polycarbodiimide comprises MDI (in any the three isomers (2,2'-MDI, 2,4'-MDI, and 4,4'-MDI). Alternatively, the isocyanate component may comprise a blend of two or all three of these three MDI isomers, i.e., the isocyanate component may comprise at least two of 2,2'-MDI, 2,4'-MDI, and 4,4'-MDI.

In certain other embodiments, the isocyanate component for forming the polycarbodiimide comprises toluene diisocyanate (TDI). The isocyanate component may comprise either isomer of toluene diisocyanate (TDI), i.e., the isocyanate component may comprise 2,4-toluene diisocyanate (2,4-TDI) or 2,6-toluene diisocyanate (2,6-TDI). Alternatively, the isocyanate component may comprise a blend of these isomers, i.e., the isocyanate component may comprise both 2,4-toluene diisocyanate (2,4-TDI) and 2,6-toluene diisocyanate (2,6-TDI). One specific example of a commercially available isocyanate component suitable for the purposes of the present invention is Lupranate® T-80, which is commercially available from BASF Corporation of Florham Park, N.J. Notably, Lupranate® T-80 comprises a blend of 2,4-toluene diisocyanate (2,4-TDI) and 2,6-toluene diisocyanate (2,6-TDI). In certain embodiments, the isocyanate component consists essentially of, or consists of, TDI. Generally, the isocyanate component comprises TDI in an amount of from greater than 95, alternatively greater than 96, alternatively greater than 97, alternatively greater than 98, alternatively greater than 99, percent by weight based on the total weight of isocyanate present in the isocyanate component.

In one embodiment of the invention in which the isocyanate component is an aromatic isocyanate component, the polyurethane composition comprising the reaction product of reactants comprising:

a 100% solids isocyanate-reactive component having hydroxyl-functional groups, said isocyanate-reactive component comprising:
  30 to 95% by weight of a hydroxyl-functional polyether having a weight average molecular weight ranging from 180 to 6,500 g/mol, and
  5 to 70% by weight of an hydroxyl-functional acrylic, wherein said % by weight is based on the total weight of said hydroxyl-functional polyether and said hydroxyl-functional acrylic; and
a 100% solids aromatic isocyanate component having isocyanate-functional groups reactive with said hydroxyl-functional groups.

In certain embodiments, the aromatic isocyanate component is methylene diphenyl diisocyanate (MDI) or toluene diisocyanate (TDI), or combinations thereof.

In another embodiment of the invention in which the isocyanate component is an aliphatic isocyanate component, the polyurethane composition comprising the reaction product of reactants comprising:
a 100% solids isocyanate-reactive component having hydroxyl-functional groups, said isocyanate-reactive component comprising
  40 to 95% by weight of a hydroxyl-functional polyether having a weight average molecular weight ranging from 180 to 6,500 g/mol, and
  5 to 60% by weight of an hydroxyl-functional acrylic, wherein said % by weight is based on the total weight of said hydroxyl-functional polyether and said hydroxyl-functional acrylic; and
a 100% solids aliphatic isocyanate component having isocyanate-functional groups reactive with said hydroxyl-functional groups.

In certain embodiments, the aliphatic isocyanate component of this reaction product is hexamethylene diisocyanate (HDI).

The inclusion of 100% solids hydroxyl-functional acrylics blended with 100% solids hydroxyl-functional polyethers as the 100% solids isocyanate-reactive component in combination with a 100% solids aromatic or aliphatic isocyanate component provided improvements to one or more physical properties of the polyurethanes as compared with similar polyurethanes formed with the same hydroxyl-functional polyether and the same aromatic or aliphatic isocyanate component mixed at the same predetermined NCO/OH ratio and reacted under the same reaction conditions. Such improved physical properties include one or more of improvements to Shore hardness, tear strength, elongation at break and/or tensile strength. Moreover, the non-inclusion of solvents and/or plasticizers results in the reaction products eliminates undesired characteristics In addition, in both exemplary embodiments, the use of 100% solids hydroxyl-functional acrylics formed from a solid grade oligomer process, as compared with a batch solvent process in which the hydroxyl-functional acrylic is formed and wherein residual solvent is removed post-production, ensures that the hydroxyl-functional acrylics used are 100% solids (i.e., virtually devoid of solvents), and thus the 100% solids polyurethanes formed by the associated process of the present invention do not have residual solvent smell associated with using hydroxyl-functional acrylics formed in a conventional batch solvent process, in addition to having the improved physical properties as described above. Moreover, the elimination of solvents and plasticizers prior to, and subsequent to, forming the polyurethane reaction product eliminates potential environmental concerns or safety issues related to the inclusion of solvents and plasticizers in the process.

Of course, in certain embodiments, while the present invention is directed to 100% solids polyurethane composition, it is contemplated in alternative embodiments that that a polymer or component of the present invention used to form the polyurethane compositions may include additional volatile content in amounts such that such polymer or component may not be considered 100% solids, as defined above. By way of example, the present invention contemplates wherein the hydroxyl-functional polyethers may be diluted prior to, or after, mixing with the 100% solids acrylic polyols to yield isocyanate-reactive components having lower than 100% solids that are then subsequently reacted with the isocyanate component to yield polyurethane compositions. In this regard, the introduction of solvent, plasticizers, or the like may be included so as to reduce the viscosity of the hydroxyl-functional polyethers and the subsequent mixture of the hydroxyl-functional polyethers and hydroxyl-functional acrylics for easier processability.

The following examples are intended to illustrate the invention and are not to be viewed in any way as limiting to the scope of the invention.

EXAMPLES

Part 1: Effect of 100% Solids Hydroxyl-Functional Acrylics on Physical Properties of Polyurethane Plaques The effect of the addition of varying amounts of 100% solid hydroxyl-functional acrylics with hydroxyl-functional polyethers were evaluated for use in forming polyurethanes, in the form of polyurethane plaques, as described below.

In each of the examples below, the hydroxyl-functional acrylic was premixed with a mixture of hydroxyl-functional polyethers (the order of addition of these isocyanate-reactive components can be in any order) to maintain the resultant mixture at an equivalent weight of 400 g/mol and a hydroxyl number of about 140 mg KOH/g resin. The resultant mixture was then mixed with an aromatic or aliphatic isocyanate at a predetermined NCO/OH ratio. The hydroxyl groups of the hydroxyl-functional acrylic and the polyether polyol was then reacted with the corresponding NCO groups of the isocyanate component (either 2,4' diphenylmethane diisocyanate or carbodimide-modified 4,4'-MDI) to form polyurethane plaques. The plaques were then evaluated for various physical properties, including Graves tear strength, Shore hardness (dwell and instant), tear strength, elongation at break and tensile strength.

A summary of the formulations and results are provided in Tables 1-3 below:

TABLE 1

| Data Series 1 Formulation | | |
|---|---|---|
|  | 1 | 2 |
| Pluracol® GP730[1] | 84.0 | 76.0 |
| Pluracol® 1135i[2] | 266.0 | 239.1 |
| Joncryl® 569[3] | 0.0 | 35.0 |
| Byk 066N[4] | 0.3 | 0.3 |

TABLE 1-continued

Data Series 1 Formulation

|  | 1 | 2 |
|---|---|---|
| Dabco® 33LV[5] | 0.3 | 0.2 |
| Lupranate® MI[6] | 115.9 | 116.0 |
| Total | 467.0 | 467.1 |

[1]Hydroxyl-functional polyether available from BASF Corporation of Florham Park, New Jersey.
[2]Hydroxyl-functional polyether available from BASF Corporation of Florham Park, New Jersey.
[3]Hydroxyl-functional acrylic resin available from BASF Corporation of Florham Park, New Jersey.
[4]Defoamar available from Byk-Chemie GMBH of Geretsried, Germany.
[5]Amine catalyst available from Air Products of Allentown, Pennsylvania.
[6]A mixture of 2,4' and 4,4' Diphenylmethane Diisocyanate available from BASF Corporation of Florham Park, New Jersey.

TABLE 2

Data Series 2 Formulation

|  | 1 | 2 | 3 | 4 |
|---|---|---|---|---|
| Pluraco® GP730[1] | 84.0 | 76.0 | 67.6 | 59.2 |
| Pluracol® 1135i[2] | 266.0 | 239.1 | 212.5 | 185.9 |
| Joncryl® 569[3] | 0.0 | 35.0 | 70.0 | 105.0 |
| Byk 066N[4] | 0.3 | 0.3 | 0.3 | 0.3 |
| Dabco® 33LV[5] | 0.4 | 0.3 | 0.2 | 0.1 |
| Lupranate MM103[7] | 131.6 | 131.7 | 131.7 | 131.7 |
| Total | 482.7 | 482.8 | 482.8 | 482.8 |

[7]Carbodimide modified 4,4'-MDI available from BASF Corporation of Florham Park, New Jersey.

TABLE 3

Data Series 1 & 2 results

| TEST PERFORMED | UNIT | Data Series 1 | | Data Series 2 | | | |
|---|---|---|---|---|---|---|---|
|  |  | 0%[8] | 10%[8] | 0%[8] | 10%[8] | 20%[8] | 30%[8] |
| Graves Tear[9] | ppi | 21.803 | 41.930 | 39.94 | 56.38 | 70.21 | 128.45 |
| Shore A Hardness at Dwell[10] |  | 59.800 | 55.800 | 64.67 | 63.33 | 66.33 | 68.67 |
| Shore A Hardness Instant[10] |  | 59.800 | 59.800 | 64.67 | 63.33 | 66.33 | 77.67 |
| Shore D Hardness at Dwell[10] |  |  |  | 16.00 | 18.00 | 17.67 | 20.00 |
| Shore D Hardness Instant[10] |  |  |  | 16.00 | 22.00 | 22.33 | 24.67 |
| Split Tear[11] | ppi | 6.738 | 15.302 | 11.95 | 24.06 | 33.46 | 74.55 |
| Break Elongation[12] | % | 43.367 | 55.767 | 76.00 | 97.33 | 112.33 | 122.33 |
| Tensile-Peak Stress[13] | psi | 324.297 | 570.523 | 623.71 | 679.60 | 1007.19 | 1966.17 |

[8]% by weight of hydroxyl-functional acrylic resin used in combination with hydroxyl-functional polyether based on total weight of hydroxyl-functional polyether and acrylics.
[9]Xhead/in./min. (508 mm/min.)-Method = ASTM D624 or D3574 (Block)|Tear
[10]Dwell = 5 sec-|Method = ASTM D2240/Durometer Hardness Xhead/in./min. (508 mm/min.)-Method = ASTM D624 or D3574 (Block)|Tear
[12]Xhead = 20 in/min /Die = D412 Die C/D638 Type IV/Elong. = Crosshead|Gage L. = 3 in. (76.3 mm)
[13]Xhead = 20 in/min /Die = D412 Die C/D638 Type IV/Elong. = Crosshead|Gage L. = 3 in. (76.3 mm)

As Table 3 first confirms with respect to Data Series 1, the addition of the hydroxyl-functional acrylic resin at 10% by weight levels (using a mixture of 2,4' and 4,4' diphenylmethane diisocyanate as the isocyanate component) improved the Graves tear strength, split tear, break elongation and tensile-peak strength of the resultant polyurethane plaques as compared with polyurethane plaques formed without the hydroxyl-functional acrylic resin without adversely affecting the Shore A hardness of the resultant plaque.

As Table 3 also confirms with respect to Data Series 2, the addition of the hydroxyl-functional acrylic resin at 10, 20, and 30% by weight levels (using carbodimide-modified 4,4'-MDI as the isocyanate component) improved the Graves tear strength, split tear, break elongation and tensile-peak strength of the resultant polyurethane plaques as compared with polyurethane plaques formed without the hydroxyl-functional acrylic resin. In certain of the plaques, the Shore D hardness of the resultant plaque was also increased without adversely affecting the Shore A hardness.

The results in Table 3 were surprising and unexpected in terms of the increase in multiple physical properties by the addition of the hydroxyl-functional acrylics in combination with the hydroxyl-functional polyethers, particularly where the isocyanate component was an aromatic isocyanate (here 2,4' diphenylmethane diisocyanate).

It is to be understood that the appended claims are not limited to express and particular compounds, surface treatment materials, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A polyurethane comprising the reaction product of reactants comprising:
    a 100% solids isocyanate-reactive component having hydroxyl-functional groups, said isocyanate-reactive component comprising:
        30 to 95% by weight of a hydroxyl-functional polyether having a weight average molecular weight ranging from 180 to 6,500 g/mol, and
        5 to 70% by weight of a hydroxyl-functional acrylic,
        wherein said % by weight is based on the total weight of said hydroxyl-functional polyether and said hydroxyl-functional acrylic; and
    a 100% solids aromatic isocyanate component having isocyanate-functional groups reactive with said hydroxyl-functional groups,
    wherein the molar ratio of said isocyanate-functional groups in said aromatic isocyanate component to said hydroxyl-functional groups in said isocyanate-reactive component ranges from 0.95:1 to 1.05:1.

2. The polyurethane of claim 1, wherein said hydroxyl-functional polyether has weight average molecular weight ranging from 400 to 3,000 g/mol.

3. The polyurethane of claim 1, wherein said aromatic isocyanate component comprises methylene diphenyl diisocyanate (MDI) or toluene diisocyanate (TDI).

4. The polyurethane of claim 1, wherein the hydroxyl-functional polyether comprises a copolymer formed as a polymeric reaction product of an organic oxide and an initiator compound containing two or more active hydrogen atoms.

5. The polyurethane of claim 1 as a coating.

6. The polyurethane of claim 1 as an adhesive.

7. The polyurethane of claim 1 as a sealant.

8. The polyurethane of claim 1 as an elastomer.

9. A method for improving the physical properties of polyurethanes formed as the reaction product of a 100% solids hydroxyl-functional polyether and a 100% solids isocyanate component having isocyanate-functional groups, said method comprising;
    mixing 100% solids hydroxyl-functional acrylic and the 100% solids hydroxyl-functional polyether to form a 100% solids isocyanate-reactive component having hydroxyl-functional groups; and
    reacting the hydroxyl-functional groups of the 100% solids isocyanate-reactive component with the isocyanate-functional groups of the 100% solids isocyanate component to form the polyurethane,
    wherein the 100% solids isocyanate component having isocyanate-functional groups comprises an aromatic isocyanate component and wherein the isocyanate-reactive component comprises:
        30 to 95% by weight of a hydroxyl-functional polyether having a weight average molecular weight ranging from 180 to 6,500 g/mol, and
        5 to 70% by weight of an hydroxyl-functional acrylic,
    wherein the % by weight is based on the total weight of the hydroxyl-functional polyether and the hydroxyl-functional acrylic, and
    wherein the molar ratio of isocyanate-functional groups in the aromatic isocyanate component to hydroxyl-functional groups in the isocyanate-reactive component ranges from 0.95:1 to 1.05:1.

10. The method of claim 9, further comprising:
    forming a 100% solids hydroxyl-functional acrylic using a solid grade oligomer process.

* * * * *